(12) United States Patent
Yamaji et al.

(10) Patent No.: US 9,235,760 B2
(45) Date of Patent: Jan. 12, 2016

(54) IMAGE SYNTHESIZING SYSTEM, IMAGE PROCESSING APPARATUS, AND IMAGE PROCESSING METHOD

(71) Applicant: FUJIFILM Corporation, Tokyo (JP)

(72) Inventors: Kei Yamaji, Tokyo (JP); Takeshi Teraoka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 329 days.

(21) Appl. No.: 13/962,423

(22) Filed: Aug. 8, 2013

(65) Prior Publication Data

US 2014/0079322 A1    Mar. 20, 2014

(30) Foreign Application Priority Data

Sep. 14, 2012  (JP) .................................. 2012-202887
May 30, 2013  (JP) .................................. 2013-114258

(51) Int. Cl.
G06F 17/30  (2006.01)
G06K 9/00  (2006.01)

(52) U.S. Cl.
CPC ...... *G06K 9/00536* (2013.01); *G06F 17/30265* (2013.01)

(58) Field of Classification Search
None
See application file for complete search history.

(56) References Cited

U.S. PATENT DOCUMENTS

| | | | | |
|---|---|---|---|---|
| 8,832,570 B1 * | 9/2014 | Marra | ............... | G06F 17/30268 345/619 |
| 2003/0117651 A1 * | 6/2003 | Matraszek | ........ | G06F 17/30265 358/1.18 |
| 2004/0135902 A1 * | 7/2004 | Steensma | .......... | G06F 17/30876 348/231.99 |
| 2004/0161224 A1 | 8/2004 | Yamazoe et al. | | |
| 2004/0201692 A1 * | 10/2004 | Parulski | ............ | G06F 17/30265 348/207.1 |
| 2006/0251292 A1 * | 11/2006 | Gokturk | ............ | G06F 17/30253 382/103 |
| 2007/0008321 A1 * | 1/2007 | Gallagher | ......... | G06F 17/30265 345/473 |
| 2008/0028294 A1 * | 1/2008 | Sell | ..................... | G06F 17/3028 715/234 |
| 2011/0025714 A1 * | 2/2011 | Ptucha | .............. | G06F 17/30256 345/641 |
| 2012/0030575 A1 * | 2/2012 | Cok | .................. | G06F 17/30268 715/738 |
| 2012/0106859 A1 * | 5/2012 | Cheatle | ................... | G06T 11/60 382/225 |

FOREIGN PATENT DOCUMENTS

| | | | |
|---|---|---|---|
| JP | 2004-070614 | | 3/2004 |
| JP | 2004-246868 | | 9/2004 |
| JP | 2006-120076 | | 5/2006 |
| JP | 2006-279119 A | * | 10/2006 |
| JP | 2009-265886 | | 11/2009 |
| JP | 2011-186715 A | * | 9/2011 |
| JP | 2012-073998 A | * | 4/2012 |

* cited by examiner

*Primary Examiner* — Barry Drennan
(74) *Attorney, Agent, or Firm* — Young & Thompson

(57) ABSTRACT

An image processing apparatus comprises an image acquiring unit that acquires images from the image managing server; an image analyzing unit that analyzes the acquired images to determine evaluation values thereof; a grouping unit that groups the acquired images into groups based on collateral information of the acquired images; a group selecting unit that selects groups including images having operation information as the collateral information out of the plurality of groups; an image selecting unit that selects images out of the images included in the selected groups, based on the evaluation values and the operation information; and an image arranging unit that arranges the selected images in a predetermined layout to create the synthetic image.

20 Claims, 12 Drawing Sheets

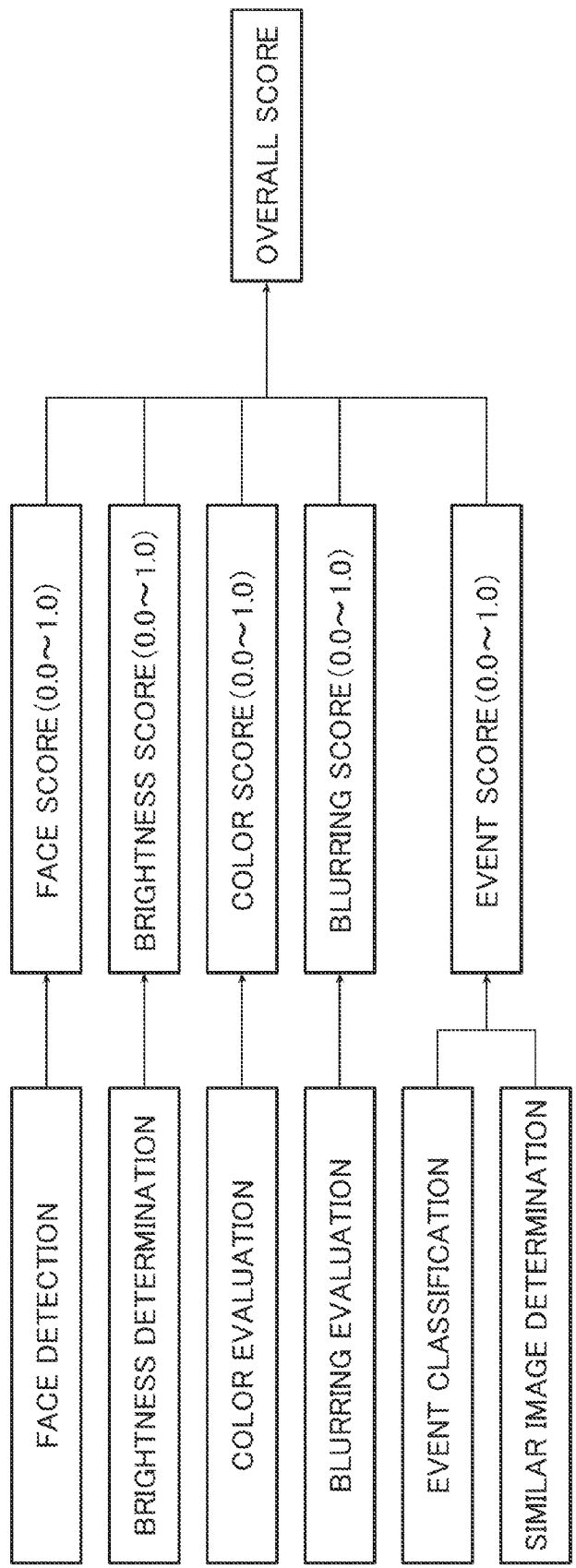

IMAGE SYNTHESIZING SYSTEM, IMAGE PROCESSING APPARATUS, AND IMAGE PROCESSING METHOD

BACKGROUND OF THE INVENTION

The present invention relates to an image synthesizing system, an image processing apparatus, and an image processing method that can create a synthetic image such as a photo book or a collage print using users' images stored in a storage of a server providing a cloud service and that can provide the created synthetic image to users.

At present, a social networking service (SNS), an online storage service, and the like are known as cloud services in which users' images are stored in a storage of a server via a network such as the Internet.

The SNS is a community type web service intended for users to communicate with each other and has, for example, a function of allowing users to share and view (or, to publish) images, which have been uploaded to a server via a network by the users, and the like.

The online storage service is a service of lending a storage (disk space) of a server to users, where the users can upload or download images to and from the server via a network.

In the cloud service such as the SNS or the online storage service, a synthetic image such as a photo book or a collage print is created using users' images stored in the storage of the server and is provided to users.

Here, the photo book is a service of creating an image collection in which a predetermined number of images selected from the users' images are arranged in a predetermined layout in a predetermined number of pages.

The collage print is a service of creating a synthetic image in which a predetermined number of images selected from the users' images are arranged in a predetermined layout in a single print.

For example, JP 2009-265886 A, JP 2006-120076 A, JP 2004-70614 A, and JP 2004-246868 A are known as technical literatures in the art that are related to the present invention.

JP 2009-265886 A discloses an image managing apparatus for providing images to plural information processing apparatuses via a network, in which a behavior pattern to images which highly catches the fancy of a visitor is individually set for each visitor, an image of which the previous operation history of a visitor corresponds to the set behavior pattern of the visitor is retrieved from the images provided, and the retrieved image is displayed on a screen or book data including the retrieved image is individually created for each visitor.

JP 2006-120076 A discloses an image processing method of creating a photo album by adding the "extent of favorite" of a sorting person as a sorting key to each image, sorting plural images belonging to the same category, setting pages of a photo album using predetermined plural photo-album templates, and extracting and arranging photographs to be arranged in the set album on the basis of the added "extent of favorite".

JP 2004-70614 A discloses a method of controlling an image processing server connected to plural terminals via communication lines, in which at least one image group including images received from a terminal is stored, vote information correlated with a specific image in a specific image group out of the images received from the terminal is counted and stored, and display information to be displayed on the terminal or other terminals accessible to the image processing server is created on the basis of the counting result of the vote information.

JP 2004-246868 A discloses an image extracting method of extracting a predetermined number of images out of plural images, in which a photo album is created by sequentially inputting the "extent of favorite" as a user's evaluation value on an image for the plural images, extracting a predetermined number of images out of the plural images on the basis of the input "extents of favorite", and arranging the extracted images in each page of the photo album.

JP 2009-265886 A, JP 2006-120076 A, JP 2004-70614 A, and JP 2004-246868 A each describe that a predetermined number of images are selected from plural images on the basis of the extent of favorite and the selected images are displayed or a photo book is created using the selected images.

However, since images uploaded using a cloud service such as an SNS or an online storage service are not images which are prepared for a synthetic image such as a photo book or a collage print by users, images not suitable for a synthetic image may be mixed therein.

SUMMARY OF THE INVENTION

An object of the present invention is to provide an image synthesizing system, an image processing apparatus, and an image processing method that can create a synthetic image such as a photo book or a collage print for which a user has a higher degree of satisfaction using collateral information of images.

In order to attain the object described above, the present invention provides an image processing apparatus that creates a synthetic image using a plurality of images stored in an image managing server, comprising:

an image acquiring unit that acquires a plurality of images from the image managing server;

an image analyzing unit that analyzes each of the acquired images to determine evaluation values thereof;

a grouping unit that groups the acquired images into a plurality of groups based on collateral information of each of the acquired images;

a group selecting unit that selects a predetermined number of groups including images having operation information as the collateral information, which is information on an operation performed on each of the acquired images by a user and is added to each of the images, out of the plurality of groups;

an image selecting unit that selects a predetermined number of images out of the images included in the selected groups, based on at least one of the evaluation values and the operation information; and an image arranging unit that arranges the predetermined number of selected images in a predetermined layout to create the synthetic image.

Also, the present invention provides an image processing method of creating a synthetic image using a plurality of images stored in an image managing server, comprising the steps of:

acquiring a plurality of images from the image managing server;

analyzing each of the acquired images to determine evaluation values thereof;

grouping the acquired images into a plurality of groups based on collateral information of each of the acquired images;

selecting a predetermined number of groups including images having operation information as the collateral information, which is information on an operation performed on each of the acquired images by a user and is added to each of the images, out of the plurality of groups;

selecting a predetermined number of images out of the images included in the selected groups, based on at least one of the evaluation values and the operation information; and arranging the predetermined number of selected images in a predetermined layout to create the synthetic image.

Also, the present invention provides an image synthesizing system comprising:

an image managing server; and the image processing apparatus according to claim 1 that creates a synthetic image using a plurality of images stored in the image managing server.

The image processing apparatus according to the present invention selects a group including images having operation information added thereto out of plural groups which have been obtained by grouping a plurality of images on the basis of collateral information of the images, selects a predetermined number of images from the images included in the selected group on the basis of evaluation values and operation information, and creates a synthetic image using the selected images. According to the present invention, since a synthetic image is created using operation information, it is possible to create a synthetic image for which a user has a higher degree of satisfaction.

BRIEF DESCRIPTION OF THE DRAWINGS

FIG. 12 is a conceptual diagram illustrating an image analysis processing which is performed by an image analyzing unit.

DETAILED DESCRIPTION OF THE INVENTION

Hereinafter, an image synthesizing system, an image processing apparatus, and an image processing method according to the present invention will be described in detail with reference to preferred embodiments shown in the accompanying drawings.

Figure 1:
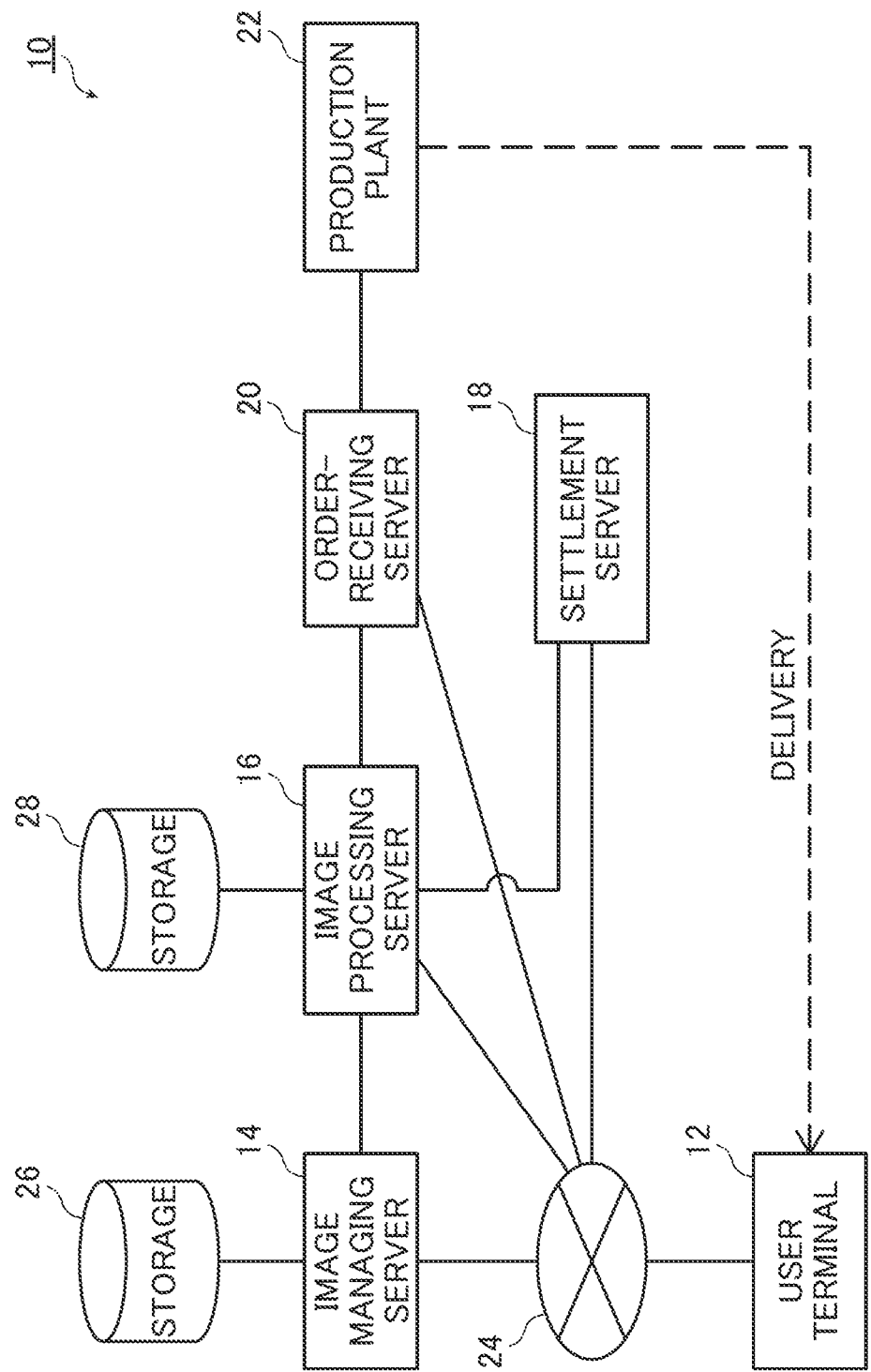
FIG. 1 is a conceptual diagram of an embodiment illustrating a configuration of an image synthesizing system according to the present invention.

FIG. 1 is a conceptual diagram of an embodiment illustrating a configuration of an image synthesizing system according to the present invention. The image synthesizing system 10 illustrated in the drawing is a system that automatically creates and provides a synthetic image such as a photo book or a collage print to a user using images uploaded to a server by a user in cooperation with a cloud service such as an SNS or an online storage service and that sells and settles an account for the created synthetic image as a virtual product or a real product in cooperation with an online settlement system or an online order-receiving system.

Here, the virtual product is image data (digital data) of a synthetic image such as a photo book or a collage print created using image data (digital data) of plural images. The virtual product is downloaded and sold via a network 24 such as the Internet, or the virtual product is recorded on a recording medium such as a CD or a DVD in a production plant 22 and the recording medium is delivered to a user.

On the other hand, the real product is a synthetic image such as a photo book or a collage print as a real object created on the basis of image data of a virtual product. The real product is produced in the production plant 22 and is delivered to a user.

The virtual product and the real product are not limited to a charged product but include a charge-free product.

As shown in FIG. 1, the image synthesizing system 10 includes a user terminal 12, an image managing server 14, an image processing server 16 which is an embodiment of the image processing apparatus according to the present invention, a settlement server 18, and an order-receiving server 20.

The user terminal 12 is used by a user to upload images (for example, photographs) possessed by the user to the image managing server 14 via the network 24 from the user terminal 12, download an image uploaded to the image managing server 14 or a synthetic image created by the image processing server 16 to the user terminal 12 via the network 24, view an image or a synthetic image, and order a virtual product or a real product.

The user terminal 12 is, for example, a mobile terminal such as a mobile phone or a smartphone, a desktop PC (Personal Computer), a notebook PC, or a tablet PC.

In the illustrated example, only the single user terminal 12 is illustrated in order to avoid complexity of the drawing, but plural user terminals 12 possessed by users using the image synthesizing system 10 are provided in practice.

The image managing server 14 functions to provide a cloud service such as an SNS or an online storage service to a user via the network 24 and includes a storage 26.

The image managing server 14 stores and manages images uploaded from the user terminal 12 via the network 24 in the storage 26, and provides images stored in the storage 26 or a synthetic image such as a photo book or a collage print acquired from the image processing server 16 to the user terminal 12 via the network 24.

It is not essential that the image managing server 14 provides the cloud service.

In addition, the image managing server 14 can store plural images in various image storage formats such as an album format (folder format) such as an online album, a storage format by date, and other storage formats.

In this embodiment, a case in which the image synthesizing system 10 cooperates with the image managing server 14 of the SNS is called SNS type, and a case in which the image synthesizing system 10 cooperates with the image managing server 14 of the online storage service is called storage type.

The cloud service is not limited to the SNS or the online storage service, but may include various services of uploading users' images to the image managing server 14 via the network 24 and storing the uploaded images in the storage 26.

The image processing server 16 functions to create a synthetic image (image data thereof) such as a photo book or a collage print using the images stored in the storage 26 of the image managing server 14 and includes a storage 28.

In this embodiment, the image processing server 16 creates a synthetic image for each online album stored in the storage 26 of the image managing server 14 and stores the created synthetic images in the storage 28.

In addition, the image processing server 16 receives an order for a virtual product or a real product from a user from the user terminal 12, and manages expiration dates of the synthetic images stored in the storage 28.

Details of the image processing server 16 will be described later.

The settlement server 18 functions to perform a settlement processing in response to a user's order online. An existing online settlement system can be used as the settlement server 18.

The order-receiving server 20 functions to perform an order-receiving processing in response to a user's order online. An existing online order receiving system can be used as the order-receiving server 20.

Details of the image processing server 16 will be described below.

Figure 2:
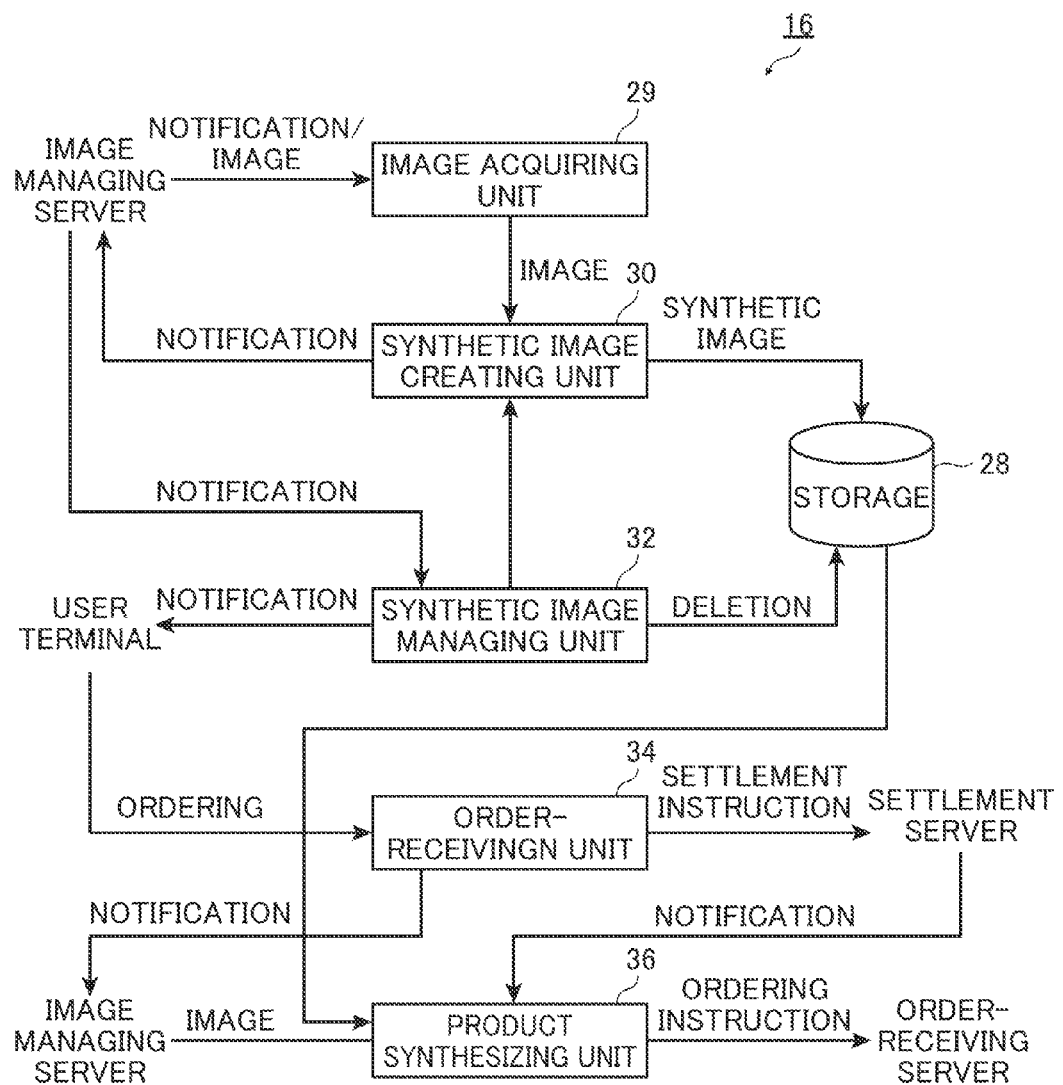
FIG. 2 is a block diagram of a first embodiment illustrating a configuration of an image processing server.

FIG. 2 is a block diagram of a first embodiment illustrating the configuration of the image processing server. The image processing server 16 illustrated in the drawing is of an SNS type and includes an image acquiring unit 29, a synthetic image creating unit 30, a synthetic image managing unit 32, an order-receiving unit 34, and a product synthesizing unit 36.

The SNS has a feature in which images are very frequently uploaded so as for a user to allow other users to view the images (to share the images with other users). A set of images uploaded in a certain period of time by a user is called an online album. When a new image is uploaded or an uploaded image is changed, the SNS type image synthesizing system 10 creates a synthetic image by online album in real time and provides the created synthetic image to the user terminal 12.

When a user uploads a new image to the image managing server 14 or adds, deletes, or edits an image in an online album stored in the storage 26 of the image managing server 14, the image acquiring unit 29 receives a notification of image change from the image managing server 14 and acquires images included in the online album in question from the storage 26 of the image managing server 14.

The synthetic image creating unit 30 functions to create a synthetic image such as a photo book or a collage print for each online album including the changed images in real time using the acquired images.

For each online album including the changed images, the synthetic image creating unit 30 acquires all the images included in the online album from the storage 26 of the image managing server 14. The synthetic image creating unit 30 analyzes and evaluates the respective acquired images, selects plural images used for a synthetic image on the basis of their evaluation values, and lays out the selected images to create the synthetic image. When the creation of the synthetic image ends, the synthetic image creating unit 30 stores the created synthetic image in the storage 28 and notifies the image managing server 14 of the end of creation of the synthetic image.

When a user deletes all the images included in an online album, the synthetic image creating unit 30 deletes the synthetic image corresponding to the online album.

Details of the synthetic image creating unit 30 will be described later.

The synthetic image managing unit 32 functions to manage synthetic images stored in the storage 28.

The synthetic image managing unit 32 manages the expiration dates of the synthetic images. When it is assumed that a synthetic image which has not been ordered even in a certain period of time, for example, two weeks, after the synthetic image is stored in the storage 28 is deleted from the storage 28, the synthetic image managing unit 32 notifies the user terminal 12 of a reminder indicating the date and time at which the synthetic image is deleted from the storage 28, for example, using a notification function of the SNS or an e-mail, just before the expiration date of the synthetic image.

In addition, the synthetic image managing unit 32 deletes the expired synthetic image through a batch processing, for example, in the night in which the load of the image processing server 16 is low, and notifies the user terminal 12 of deletion of the expired synthetic image.

When there is an album including an image violating public order and morality and it is assumed that an operator of the image managing server 14 deletes the image in question and notifies the image processing server 16 of the deletion, the synthetic image managing unit 32 manages the synthetic image creating unit 30 so that the unit 30 may newly create a synthetic image, and collects and manages statistical information on how many synthetic images each user created, how many products each user purchased, and the like, on the basis of the notification of the deletion of the image violating public order and morality.

The order-receiving unit 34 receives a user's order for a virtual product or a real product from the user terminal 12.

The order-receiving unit 34 displays a screen for inputting settlement information on a display of the user terminal 12, acquires settlement information such as ordering information indicating a virtual product or a real product ordered by the user and the number of the product; payment information such as credit card payment, cash on delivery, and bank transfer; delivery information indicating a transport company used for delivery of the ordered product; and user information such as a user address, a user name, and a phone number, and notifies the settlement server 18 of the acquired settlement information and an instruction of settlement.

The order-receiving unit 34 notifies the image managing server 14 of the end of ordering when the ordering ends.

When the notification of the end of settlement is received from the settlement server 18, the product synthesizing unit 36 synthesizes a virtual or real product (image data thereof) ordered by the user using images included in an online album ordered by the user and image data of a synthetic image of the online album.

In this embodiment, when an image is uploaded from the user terminal 12 to the image managing server 14, the image managing server 14 creates plural images having different resolutions, for example, images having five different resolutions, from the uploaded image and stores the created images in the storage 26.

In the case of a virtual product, since a virtual product only needs to be viewed on the screen of the user terminal 12, the product synthesizing unit 36 performs a synthesis processing of outputting an image of 800×600 pixels, for example, using images of 640×480 pixels as the input.

On the other hand, in the case of a real product subjected to silver-halide printing, the product synthesizing unit 36 performs an image correction processing, for example, using an image correcting tool and then performs a synthesis processing of outputting an image of 3000×2000 pixels having a high resolution as compared with the case of a virtual product using images of 1024×768 pixels having a high resolution as compared with the case of a virtual product as the input.

The product synthesizing unit 36 notifies the order-receiving server 20 of image data of the synthesized virtual product or real product, settlement information, and an instruction of ordering.

Next, the operation of the SNS type image synthesizing system 10 shown in FIGS. 1 and 2 will be described below.

First, a user uploads one or more images (image data thereof) from the user terminal 12 to the image managing server 14 via the network 24.

The image managing server 14 receives a series of images uploaded in a certain period of time from the user terminal 12, stores the received images as an online album in the storage 26, and notifies the image processing server 16 of change of images in the storage 26.

When the uploaded images are stored in the storage 26 of the image managing server 14, a user can any time view the images included in an online album using the user terminal 12 for each online album.

In the SNS web site, for example, thumbnail images of representative images of the online albums are displayed as a list of online albums uploaded by the user.

When a user clicks one online album in the list of online albums with an input device such as a mouse, thumbnail images of the respective images are displayed as a list of images included in the clicked online album.

Subsequently, in the image processing server 16, when the notification of change of images is received from the image managing server 14, the synthetic image creating unit 30 creates a synthetic image such as a photo book or a collage print in real time using the images included in an online album for each online album newly uploaded. The synthetic image creating unit 30 stores the created synthetic image in the storage 28 and notifies the image managing server 14 of the end of creation of the synthetic image.

Subsequently, when the notification of the end of creation of the synthetic image is received from the image processing server 16, the image managing server 14 notifies the user terminal 12 of the notification, for example, using a newsfeed function of the SNS.

When a user clicks a news corresponding to the notification of the end of creation of the synthetic image in a list of news feeds displayed on the display of the user terminal 12 using an input device such as a mouse, the image managing server 14 acquires the synthetic image corresponding to the notification of the end of creation of the synthetic image from the storage 28 of the image processing server 16 and displays the acquired synthetic image on the display of the user terminal 12.

That is, when images are uploaded by a user, the user can view the synthetic image such as a photo book or a collage print created using the images included in an online album in real time for each online album.

In the SNS, it is possible to set a range to which the images uploaded to the image managing server 14 are published (to set users sharing the images). Similarly, as for the synthetic image, it is possible to set a range to which the synthetic image is published, and the synthetic image can be published to (shared among) users.

A user can do addition of a new image to an online album, edition such as deletion, rotation, and correction (color adjustment, trimming, and the like) of an existing image included in the online album, change of a cover image of a photo album, change of the title or explanatory text of the online album, and the like.

For example, when a user changes images stored in an online album in the storage 26, the image managing server 14 notifies the image processing server 16 of the change of images in the storage 26.

Here, the notification of the change of images includes not only the change of images, but also the change of a cover image of the photo album, the change of the title or explanatory text of the online album, and the like.

In the image processing server 16, when the notification of the change of images is received from the image managing server 14, the synthetic image creating unit 30 creates a synthetic image in real time again for each online album including the changed images. The synthetic image creating unit 30 stores the re-created synthetic image in the storage 28 and notifies the image managing server 14 of the end of re-creation of the synthetic image.

The subsequent operation of the image managing server 14 is the same as described above.

That is, when an image included in an online album is changed, a synthetic image corresponding to the changed image is created again in real time and is displayed on the display of the user terminal 12.

When a synthetic image is re-created for every edition of an image by a user, the load of the server becomes excessively large. Therefore, it is preferable that the synthetic image creating unit 30 creates a synthetic image again at a timing at which the user clicks a synthetic image update button displayed at the same time as an image edition screen is displayed on the display of the user terminal 12 using an input device such as a mouse, for example, in a step in which the operation of editing all images ends, instead of automatically re-creating a synthetic image.

In this case, a user can display an updated synthetic image by pushing the synthetic image update button at the timing at which the user wants to re-create a synthetic image. When the user does not want to display the updated synthetic image, the user does not need to push the update button.

On the other hand, as a back-end processing, the synthetic image creating unit 30 may automatically update the synthetic image not reflecting the newest state of the online album to a synthetic image reflecting the newest state of the online album when the load of the server is low, such as in the night.

Furthermore, it is preferable that when the operator of the image managing server 14 notifies the image processing server 16 of deletion of an image violating public order and morality, the synthetic image creating unit 30 update the synthetic image of the online album which included the deleted image.

In the image processing server 16, the synthetic image managing unit 32 notifies the user terminal 12 of a reminder indicating the date and time at which a synthetic image just before the expiration date thereof would be deleted from the storage 28.

When the reminder indicating that the expiration date is near is received from the image processing server 16, the user determines whether or not to order the virtual product or the real product of the online album just before the expiration date thereof. Then, the user can order the virtual product or the real product of the online album in display by clicking an ordering button displayed at the same time as the synthetic image is displayed on the display of the user terminal 12 using an input device such as a mouse.

Here, when a synthetic image reflecting the newest state of the online album is created at the time of editing images in the online album, the re-creation of the synthetic image is not performed at the time of ordering and the synthetic image updated during the edition is displayed as the synthetic image for confirmation of order on the display of the user terminal 12.

On the other hand, when a user has not clicked the synthetic image update button after editing the images in the online album, that is, when the newest state of the online album has not been reflected in the synthetic image, re-creation of the synthetic image is performed at the time of ordering and the synthetic image updated at the time of ordering is displayed as a synthetic image for confirmation of order on the display of the user terminal 12.

Subsequently, when the user clicks an ordering button displayed on the display of the user terminal 12 using a mouse or the like, the order-receiving unit 34 in the image processing server 16 displays a screen for inputting settlement information on the display of the user terminal 12, and acquires the settlement information including ordering information, payment information, delivery information, user information, and the like. Then, when the user clicks a decision button for final order, the order-receiving unit 34 transmits the acquired settlement information and the instruction of settlement to the settlement server 18 and notifies the image managing server 14 of the end of ordering.

The image managing server 14 receives the notification of the end of ordering from the image processing server 16 and manages the ordering history. The user can any time view the ordering history on the display screen of the user terminal 12.

When the settlement information and the instruction of settlement are received from the image processing server 16, the settlement server 18 performs a settlement processing on the user's order using the settlement information. That is, payment of purchase money for a product in response to the user's ordering is performed online from the settlement server 18 to the order-receiving server 20. When the settlement processing ends, the settlement server 18 notifies the image processing server 16 of the end of the settlement processing.

Subsequently, when the notification of the end of the settlement processing is received from the settlement server 18, the product synthesizing unit 36 of the image processing server 16 synthesizes the virtual product or the real product ordered by the user.

The product synthesizing unit 36 notifies the order-receiving server 20 of the image data of the synthesized virtual product or real product, the settlement information, and the instruction of ordering.

When the notification of the image data of the synthesized virtual product or real product, the settlement information, and the instruction of ordering is received from the image processing server 16, the order-receiving server 20 performs an order-receiving processing for the user's ordering. Using the settlement information, the order-receiving server 20 displays a screen for downloading the virtual product on the display of the user terminal 12 or requests the production plant 22 to produce a CD or a DVD storing the image data of the virtual product or to produce the real product.

In addition, payment of production cost for the product ordered by the user is performed online from the order-receiving server 20 to the production plant 22, and payment of the royalty for the user's ordering is performed online from the order-receiving server 20 to the image managing server 14.

When the request for producing the virtual product or the real product is received from the order-receiving server 20, the production plant 22 produces a product on the basis of the image data of the virtual product or the real product and the settlement information and delivers the produced product to the user using a designated transport company.

Figure 3:
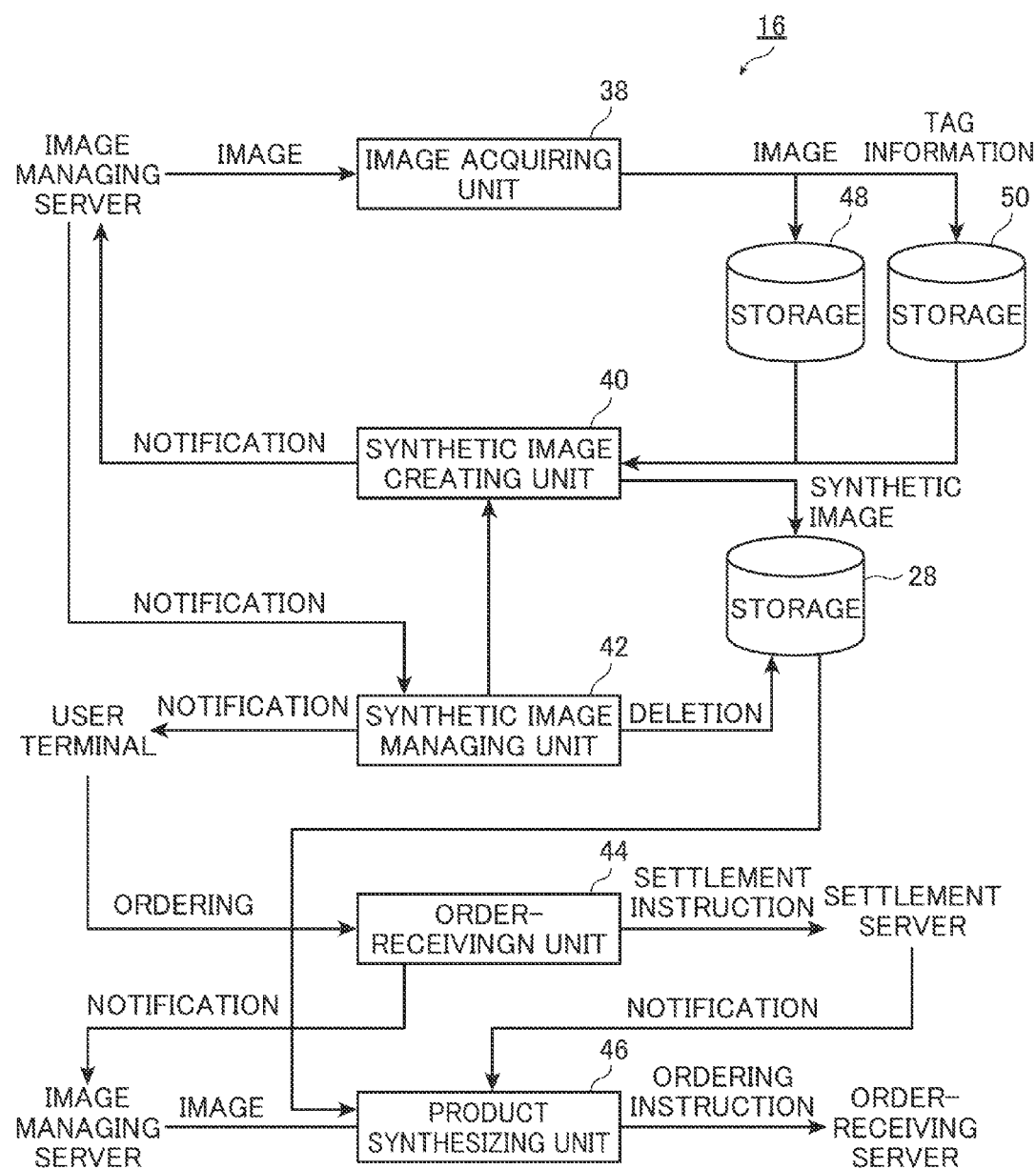
FIG. 3 is a block diagram of a second embodiment illustrating the configuration of the image processing server.

Next, FIG. 3 is a block diagram of a second embodiment illustrating the configuration of the image processing server. The image processing server 16 illustrated in the drawing is of a storage type and includes an image acquiring unit 38, a synthetic image creating unit 40, a synthetic image managing unit 42, an order-receiving unit 44, and a product synthesizing unit 46.

In the online storage, a user uploads images, for example, for the purpose of backup. In the storage type image synthesizing system 10, images are classified (grouped) on the basis of various conditions such as date, subject, and event such as summer vacation in accordance with tag information of Exif or the like attached to the images (collateral information). Images are accumulated and at a time point at which images in a certain class reach a predetermined number, for example, 30 or more, a synthetic image is created and provided to the user terminal 12 in accordance with the classification.

The image acquiring unit 38 functions to periodically perform a synchronous processing of acquiring images stored in the storage 26 of the image managing server 14, for example, once every three days, and includes storages 48 and 50.

The image acquiring unit 38 acquires images from the storage 26 of the image managing server 14, optionally changes resolutions of the images, and stores the images in the storage 48. Also, the image acquiring unit 38 extracts tag information from the acquired images, and stores the extracted tag information in the storage 50.

The tag information is attached to each image. In addition to tag information such as the shooting date and time of an image, the image size, and the type of an image shooting device which are automatically attached to the image by an image shooting device, the user can input arbitrary tag information using an input device such as a keyboard. For example, the arbitrary tag information includes event information such as birthday, sports day, and the like, person information such as family, friends, and the like, and favorite information indicating an image preferred by the user. The image acquiring unit 38 may acquire all images again for each synchronous processing, but in consideration of the load of the synchronous processing, it is preferable that only the images which are changed after the previous synchronous processing be acquired.

Similarly to the synthetic image creating unit 30 of the SNS type image processing server 16, the synthetic image creating unit 40 creates a synthetic image for each online album of which the tag information stored in the storage 50 satisfies a predetermined condition using the images included in the online album stored in the storage 48.

For example, the synthetic image creating unit 40 creates a synthetic image of an online album including birthday images or creates a synthetic image of an online album including family images, on the basis of the tag information.

The synthetic image managing unit 42, the order-receiving unit 44, and the product synthesizing unit 46 are the same as the synthetic image managing unit 32, the order-receiving unit 34, and the product synthesizing unit 36 of the SNS type image processing server 16, respectively.

Next, the operation of the storage type image synthesizing system 10 shown in FIGS. 1 and 3 will be described below.

A user uploads one or more images (image data thereof) from the user terminal 12 to the image managing server 14 via the network 24.

The image managing server 14 receives a series of images which are uploaded in a certain period of time from the user terminal 12 and stores the received images as an online album in the storage 26.

In the image processing server 16, the image acquiring unit 38 performs a synchronous processing of periodically acquiring the images stored in the storage 26 of the image managing server 14 and stores images and tag information in the storages 48 and 50, respectively, for each online album.

The synthetic image creating unit 40 creates a synthetic image for each online album of which the tag information satisfies a predetermined condition using the images included in the online album stored in the storage 48. Then, the synthetic image creating unit 40 stores the created synthetic image in the storage 28 and notifies the image managing server 14 of the end of creation of the synthetic image.

When the notification of the end of creation of the synthetic image from the image processing server 16 is received, the image managing server 14 notifies the user terminal 12 of the notification, for example, using an e-mail.

When the user clicks (selects) a link to the synthetic image described in the e-mail using an input device such as a mouse, the image managing server 14 acquires the synthetic image from the storage 28 of the image processing server 16 and displays the acquires synthetic image on the display of the user terminal 12.

The subsequent operation is the same as in the SNS type image synthesizing system 10.

Next, details of the synthetic image creating unit 30 will be described below.

The same is true of the synthetic image creating unit 40.

Figure 4:
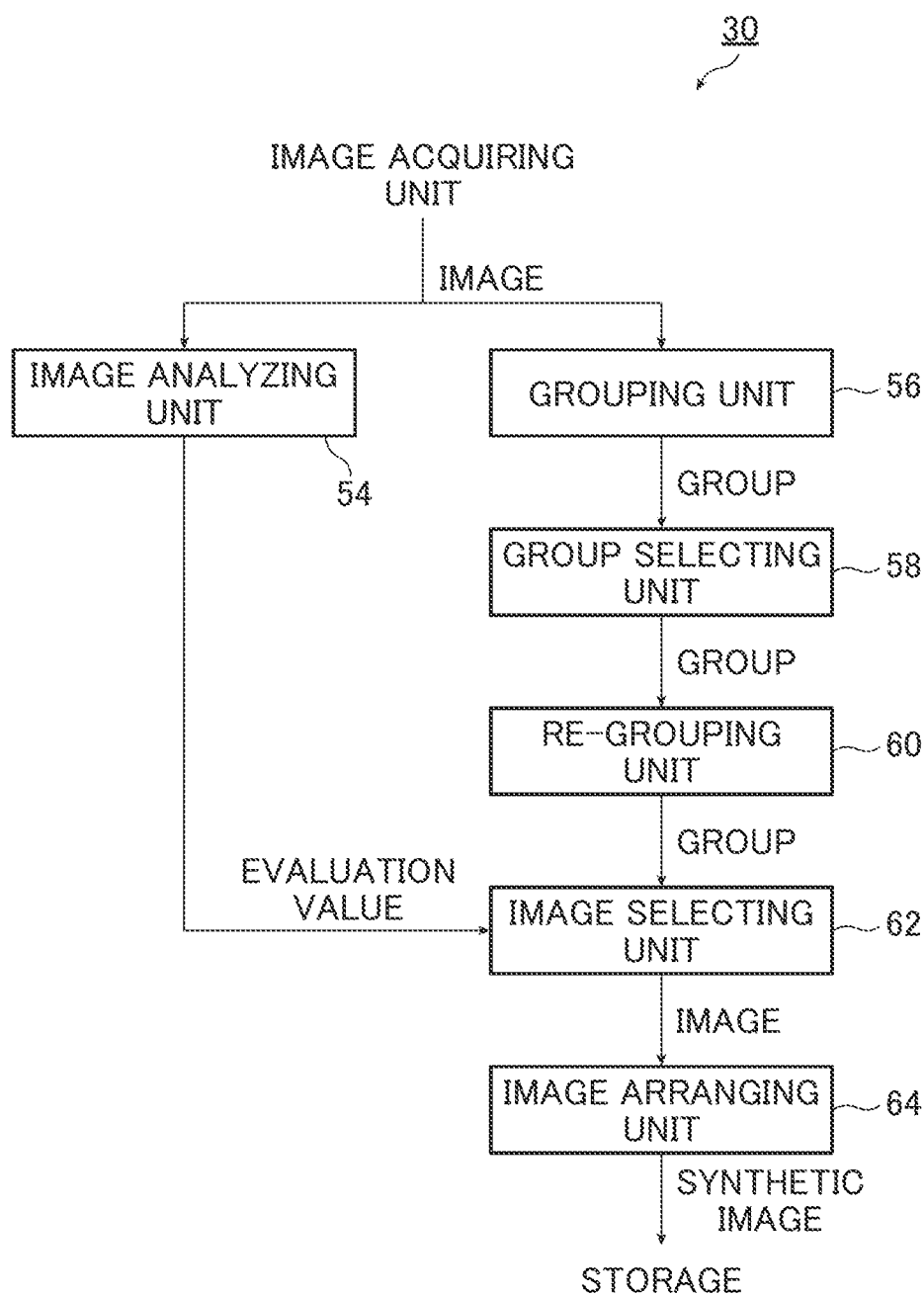
FIG. 4 is a block diagram illustrating a configuration of a synthetic image creating unit.

FIG. 4 is a block diagram illustrating the configuration of the synthetic image creating unit. The synthetic image creating unit 30 illustrated in the drawing includes an image analyzing unit 54, a grouping unit 56, a group selecting unit 58, a re-grouping unit 60, an image selecting unit 62, and an image arranging unit 64.

In the synthetic image creating unit 30, the image analyzing unit 54 analyzes each of the images included in the online album acquired by the image acquiring unit 29 to determine the evaluation values thereof.

Details of the image analyzing unit 54 will be described later.

The grouping unit 56 groups plural images in the online album acquired by the image acquiring unit 29 into plural groups on the basis of collateral information of the respective acquired images.

When shooting date and time is used as the collateral information, the grouping unit 56 groups the plural images in the acquired online album into plural groups so that two images with a relatively long shooting time interval between them may be included in different groups.

Figure 5:
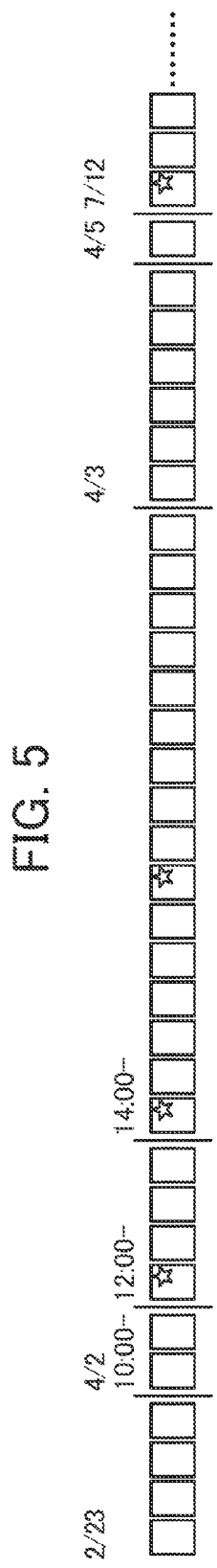
FIG. 5 is a conceptual diagram illustrating a state where images of an online album are grouped into plural groups.

In the example illustrated in FIG. 5, plural images are grouped into a group shot on February 23, a group shot on April 2 at or after 10:00, a group shot on the same day at or after 12:00, a group shot on the same day at or after 14:00, a group shot on April 3, a group shot on April 5, a group shot on July 12, . . . , on the basis of the shooting date and time.

When the shooting location is used as the collateral information, the grouping unit 56 groups plural images into plural groups according to the shooting location. The images may be grouped using the collateral information other than the shooting date and time or the shooting location.

Subsequently, the group selecting unit 58 selects, from among the plural groups, a predetermined number of groups including the images to which operation information on operations performed by the user on each of the images is added as the collateral information of each of the images.

Figure 6:
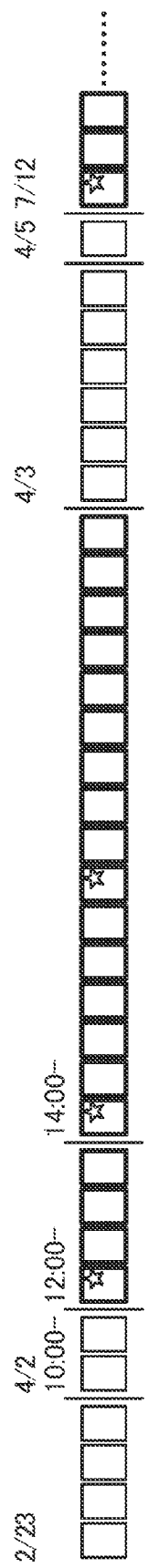
FIG. 6 is a conceptual diagram illustrating a state where a group including images having operation information added thereto is selected from plural groups.

In the example illustrated in FIG. 6, the group shot on April 2 at or after 12:00, the group shot on the same day at or after 14:00, the group shot on July 12, . . . (groups including images shown with bold frames) are selected. In the drawing, images having a star mark are images having the operation information added thereto as the collateral information.

Here, examples of the operation information include added information such as "like" (favorite information) and "comment" added to the images by the user, evaluation information such as 5-step importance levels added to the images by the user, tag information added to the images by the user, edition information on edition performed on the images by the user, ordering information of the images (such as images ordered as digital camera prints or images used for a photo book), and viewing information (such as the viewing frequency and the viewing time) of the images. When an image is published (shared), the viewing information includes viewing information of other users (image sharers) in addition to viewing information of the user (image owner) who uploaded the image to the image managing server 14.

The added information of "like" is added to a favorite image of the user in the SNS, for example, if the user clicks a button "like" displayed in correlation with the image in the web page having the image displayed therein using an input device such as a mouse. Similarly, the added information of "comment" is added to an image in the SNS, for example, on which the user wants to write a comment, if the user writes a comment in a comment input box displayed in correlation with the image in the web page having the image displayed therein using an input device such as a keyboard.

Here, when the number of images included in all the selected groups is equal to or more than a recommended number of images, the group selecting unit 58 ends the processing.

For example, a photo book of 16 pages can be created using 16 images, but one image is arranged in one page in this case, which causes poor attractiveness. Therefore, in order to enhance the attractiveness of the photo book (in order to arrange plural images in one page), the number of images to be recommended (the recommended number of images) is defined. For example, when four images are arranged in each page, the recommended number of images is 4 images×16 pages=64.

On the other hand, when the number of images included in all the selected groups is less than the recommended number of images, the group selecting unit 58 selects a predetermined number of first additional groups out of the groups (groups not having operation information added thereto) of the same date as the selected groups.

Figure 7:
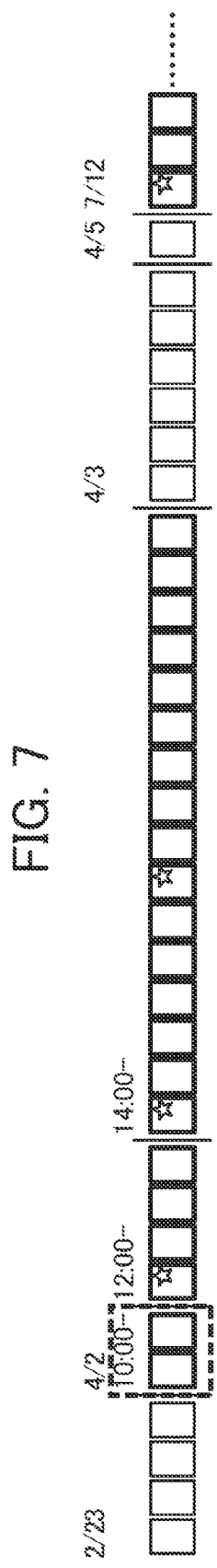
FIG. 7 is a conceptual diagram illustrating a state where a first additional group is selected from groups of the same date as a selected group.

In the example illustrated in FIG. 7, the group shot at or after 10:00 (as surrounded with dotted lines) is selected from among the three groups shot on April 2 which are the same group as the group selected first. The first additional group may be selected out of the groups of the same date as another selected group, such as the group shot on July 12.

Here, when the number of images included in all the groups including the first additional group that are selected hitherto is equal to or more than the recommended number of images, the group selecting unit 58 ends the processing.

On the other hand, when the number of images included in all the groups including the first additional group that are selected hitherto is less than the recommended number of images, the group selecting unit 58 selects a predetermined number of second additional groups out of the groups (groups not having operation information added thereto) closest in date (shooting date and time) to the selected groups.

Figure 8:
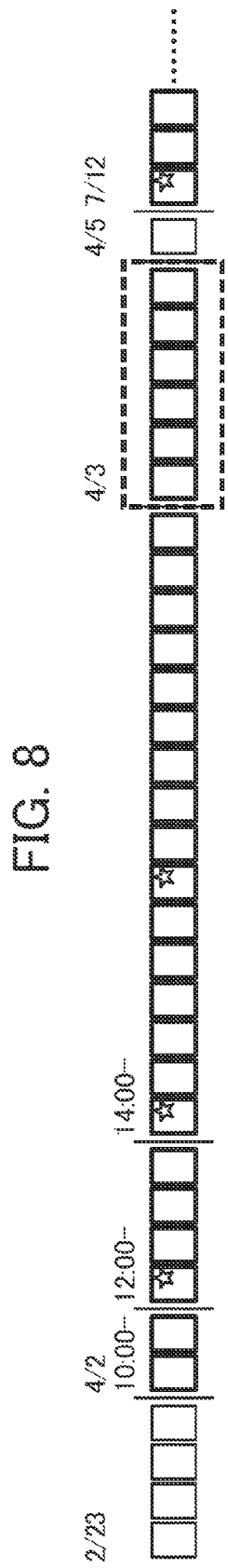
FIG. 8 is a conceptual diagram illustrating a state where a second additional group is selected from groups of a date closest to the date of a selected group.

In the example illustrated in FIG. 8, the group shot on April 3 (as surrounded with dotted lines) which is closest in date to the selected groups shot on April 2 is selected. Similarly, the second additional group may be selected out of the groups of a date which is closest to that of another selected group, such as the group shot on July 12.

When the number of images included in all the groups including the first and second additional groups that are selected hitherto is equal to or more than the recommended number of images, the group selecting unit 58 ends the processing.

On the other hand, when the number of images included in all the groups including the first and second additional groups that are selected hitherto is less than the recommended number of images, the group selecting unit 58 selects a predetermined number of third additional groups out of the groups (groups not having operation information added thereto) second closest in date to the selected groups. Hereafter, an additional group is repeatedly selected until the number of images included in all the groups including the first to third additional groups that are selected hitherto is equal to or more than the recommended number of images if the former is less than the latter.

The recommended number of images may be determined as a fixed value in advance, for example, depending on the number of pages of a photo book or may be dynamically determined depending on the number of pages of a photo book and image details (the number of images suitable for the photo book).

In the case where the recommended number of images is set to a fixed value depending on the number of pages of a photo book, for example, when the number of pages is 24 and two images are arranged in each page, the recommended number of images is 48. For example, when the number of pages is 32 and similarly, two images are arranged in each page, the recommended number of images is 64. The recommended number of images can be determined in the same way even when the number of pages and the number of images in each page are changed.

In the case where the recommended number of images is dynamically determined depending on the number of pages of a photo book and image details (the number of images suitable for the photo book), the range (with upper and lower limits) of the recommended number of images is set depending on the number of pages, images not suitable for the photo book (images such as a dark image, a blurred image, and a similar image) are extracted from a predetermined number of images selected by the image selecting unit 62, and the recommended number of images is dynamically determined in the range of the recommended number of images depending on the number of the images suitable for the photo book that remain after the extraction.

When the number of images to be arranged in each page of a photo book is excessively large, the image size of each image becomes small. On the contrary, when the number of images is excessively small, the visual quality of the photo book becomes poor.

Therefore, the range (with upper and lower limits) of the recommended number of images is set depending on the number of pages so that the number of images in each page is constant.

When the number of images suitable for the photo book is equal to or more than the upper limit of the range of the recommended number of images, the recommended number of images is determined to be the upper limit. When the number of images suitable for the photo book is in the range of the recommended number of images, the recommended number of images is determined to be the number of images suitable for the photo book. However, when the number of images suitable for the photo book is equal to or less than the lower limit of the range of the recommended number of images, a priority is given to use of not less than a fixed number of images in the photo book, and the recommended number of images is determined to be the lower limit of the range of the recommended number of images.

For example, if the number of pages of a photo book is 24 and the range of the recommended number of images is a range of 40 to 60, when the number of the images suitable for the photo book that remain after the extraction is 65, a number more than the upper limit of the range of the recommended number of images, the recommended number of images is determined to be 60 which is the upper limit of the range of the recommended number of images. When the number of the images suitable for the photo book that remain after the extraction is 48, a number within the range of the recommended number of images, the recommended number of images is determined to be 48 which is the number of images suitable for the photo book. When the number of the images suitable for the photo book that remain after the extraction is 34, a number less than the lower limit of the range of the recommended number of images, the recommended number of images is determined to be 40 which is the lower limit of the range of the recommended number of images. The same is true in the cases where the range of the recommended number of images and the number of the images suitable for the photo book that remain after the extraction are changed.

Subsequently, the re-grouping unit 60 re-groups a given number of selected groups depending on the number of pages of the photo book. For example, when the number of pages of the photo book is 10, the re-grouping unit 60 re-groups the selected groups into 10 groups.

Figure 9:
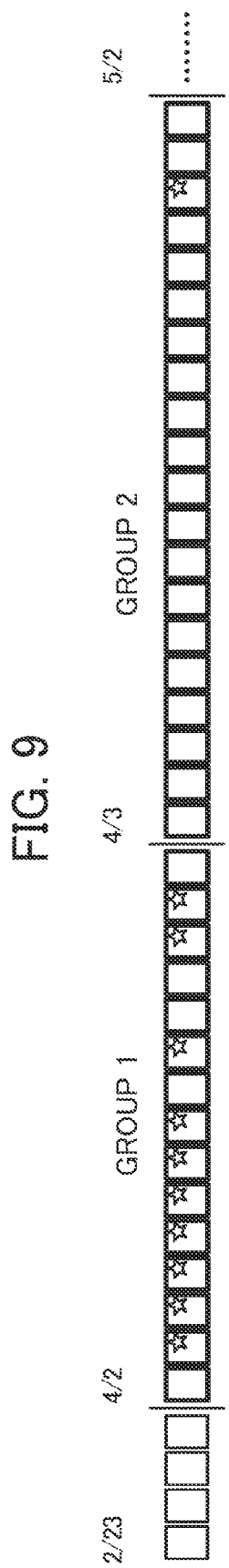
FIG. 9 is a conceptual diagram illustrating Group 1 of which the number of images is 15 and which includes 10 images having operation information added thereto and Group 2 of which the number of images is 20 as the largest number of images and which includes a single image having operation information added thereto.

For example, as illustrated in FIG. 9, it is assumed that the number of images in Group 1 (a group including the largest number of images having operation information added thereto) is 15, the number of images having operation information added thereto in Group 1 is 10, the number of images in Group 2 (a group including the largest number of images) is 20, and the number of images having operation information added thereto in Group 2 is 1.

Group 1 including a large number of images having operation information added thereto is a group important to the user, and the images in Group 1, even those having no operation information added thereto, are higher in importance level than the images of other groups.

Figure 10:
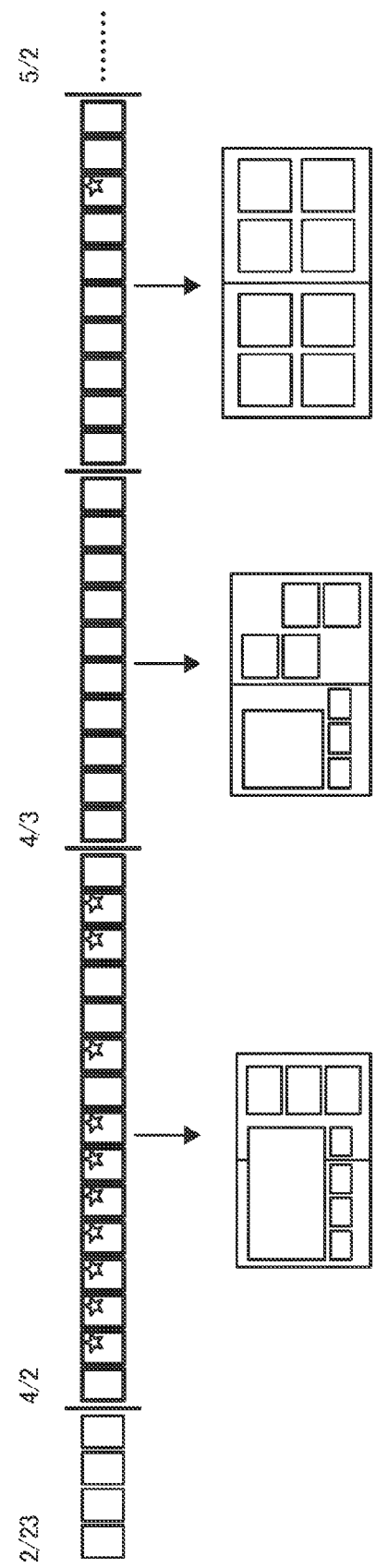
FIG. 10 is a conceptual diagram illustrating a state where 20 images in Group 2 including the largest number of images are grouped into two groups of 10 images.

Therefore, as illustrated in FIG. 10, when 20 images in Group 2 including the largest number of images are grouped into two groups each including 10 images, the images of Group 1 which includes a large number of images having operation information added thereto and having higher importance levels are crowded into one page of the photo book. In the example illustrated in the drawing, when the number of images having operation information added thereto in Group 1 is 10 and the number of images to be arranged in one page of the photo book is 8, there may be images in Group 1 which are not used in the photo book, even if the images have operation information added thereto.

Therefore, when the number of pages of the photo book is larger than the number of selected groups, the re-grouping unit 60 performs a re-dividing processing to divide the images of the group in which the number of images having operation information added thereto is larger than the maximum number of images to be arranged in one page of the photo book into two groups between images having the longest shooting time interval between them.

It is preferable that the re-dividing processing be repeatedly performed until the number of images having operation information added thereto in a group obtained by the re-dividing processing is equal to or less than the maximum number of images to be arranged in one page of the photo book.

In addition, when there is no group in which the number of images having operation information added thereto is more than the maximum number of images to be arranged in one page of the photo book, the images of the group which includes the largest number of images are divided into two groups between images having the longest shooting time interval between them.

On the other hand, when the number of pages of the photo book is less than the number of selected groups, the re-grouping unit 60 performs a re-coupling processing to couple two groups having the shortest shooting time interval between them into one group.

Here, when the number of images having operation information added thereto in the group obtained by the re-coupling processing becomes more than the maximum number of images to be arranged in one page of the photo book, the re-coupling processing is not performed and two groups having the second shortest shooting time interval between them are coupled into one group.

Figure 11:
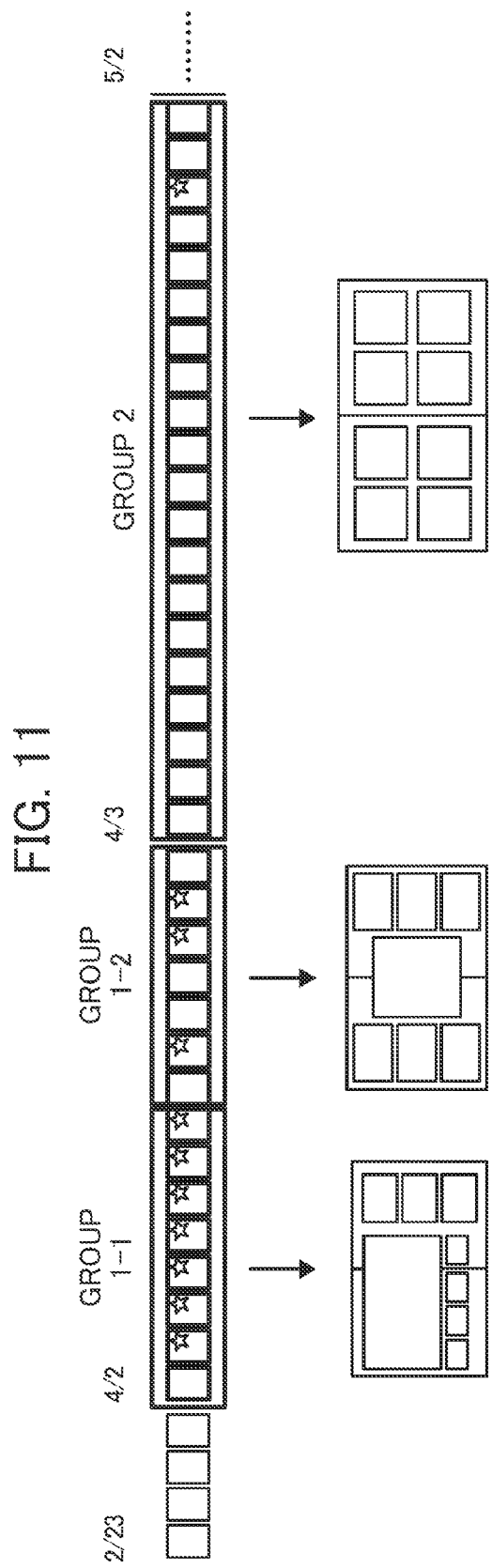
FIG. 11 is a conceptual diagram illustrating a state where 15 images in Group 1 including the largest number of images having operation information added thereto are grouped into two groups of 8 images and 7 images.

For example, in the example illustrated in FIG. 9, the re-grouping unit 60 divides 15 images in Group 1 which has the largest number of images having operation information added thereto into two groups, namely, Group 1-1 including 8 images and Group 1-2 including 7 images, as illustrated in FIG. 11.

Accordingly, the images of Group 1 having a high importance level are divided into two groups and all the images having operation information added thereto in the groups thus obtained are arranged in two pages of the photo book, respectively.

The reason for performing the re-dividing processing or the re-coupling processing in consideration of the images having operation information added thereto as described above is to prevent images having operation information added thereto from not being used in the layout of the photo book in the case where the number of images having operation information added thereto in a group is more than the maximum number of images to be arranged in one page of the photo book through the re-dividing or re-coupling of groups.

When the number of selected groups is equal to the number of pages of the photo book and the number of images having operation information added thereto in a group is equal to or less than the maximum number of images to be arranged in one page of the photo book, the re-grouping unit 60 needs neither to perform the re-dividing processing nor the re-coupling processing.

Subsequently, for each re-grouped group, the image selecting unit 62 selects a predetermined number of images out of plural images included in the relevant group on the basis of the operation information and the evaluation values.

For example, when the maximum number of images to be arranged in one page of the photo book is 8 and the number of images having operation information added thereto is 8, the image selecting unit 62 selects all the images having operation information added thereto.

When the number of images having operation information added thereto is in a range of 1 to 7, the image selecting unit 62 selects all the images having operation information added thereto and selects the other image or images out of the images not having operation information added thereto in the group on the basis of their evaluation values determined by the image analyzing unit 54 until the total number of images reaches the maximum number of images to be arranged in one page of the photo book.

When there is no image having operation information added thereto in the relevant group, the image selecting unit 62 selects 8 images out of the images not having operation information added thereto in the group on the basis of their evaluation values determined by the image analyzing unit 54.

In the example illustrated in FIG. 11, all of 8 images of Group 1-1 are selected, all of 7 images of Group 1-2 are selected, and 8 images including one image having operation information added thereto are selected out of 20 images of Group 2.

Subsequently, the image arranging unit 64 arranges a predetermined number of selected images in a predetermined layout in corresponding pages of the photo book (that is to say, effects automatic layout) to create a synthetic image.

In the example illustrated in FIG. 11, the images selected from each group are arranged in two facing pages.

It is preferable that the image arranging unit 64 arranges the image selected from the images having operation information added thereto out of a predetermined number of selected images in a large area (with a large image size).

As described above, the synthetic image creating unit 30 selects a group including images having operation information added thereto out of plural groups, selects a predetermined number of images out of the images included in the selected group on the basis of the evaluation values and the operation information, and creates a synthetic image using the selected images.

That is, since the image processing server 16 creates a synthetic image such as a photo book or a collage print using the operation information including the added information such as "like" or "comment", for example, it is possible to create a synthetic image having a higher degree of user satisfaction.

While creation of a photo book is described as an example, the same is true of creation of a collage print. When a collage print is created, for example, collage prints corresponding in number to the groups selected by the group selecting unit 58 can be created and sequentially presented to a user. When a collage print is created, the re-grouping by the re-grouping unit 60 may be performed or may not be performed.

The importance level of the added information such as "like" and "comment" may be considered. For example, the importance level can be set depending on the person who added such added information as "like" and "comment", the length of "comment", the reply to "comment", the addition frequency of "like", the number of addition of "like", and the like.

Regarding the person who added such added information as "like" and "comment", for example, a friend is set to a high importance level and a third party is set to a low importance level.

Regarding the length of "comment", for example, a long comment (a comment with the number of characters equal to or more than a predetermined number of characters) is set to a high importance level and a short comment (a comment with the number of characters less than a predetermined number of characters) is set to a low importance level.

Regarding the reply to "comment", for example, a high importance level is set when a user replies to the comment, and a low importance level is set when no user replies to the comment.

Regarding the addition frequency of "like", for example, a high importance level is set when the addition frequency is low, that is, when the time interval until a "like" button is second clicked after the "like" button is first clicked is long, because it is thought that "like" is added with sufficient consideration. A low importance level is set when the addition frequency is high, because it is thought that "like" is added without sufficient consideration.

Regarding the number of addition of "like", a high importance level is set when the number of addition of "like" is small, for example, when "like" is added to only one image in one online album. A low importance level is set when the number of addition of "like" is large, that is, when "like" is added to plural images in one online album.

The importance level is not limited to two steps of high and low, but may be set in three or more steps. For example, regarding the person who added such added information as "like" and "comment", the importance level may be given stepwise to plural categories such as family member, friend, acquaintance, and third party. The same is true of other factors.

For example, when the group selecting unit 58 selects a group or when the image selecting unit 62 selects an image, it can be determined whether or not the added information such as "like" and "comment" should be used, depending on the importance level of the added information such as "like" and "comment". For example, when the importance level is low (or when the importance level is set in multiple steps and is as predetermined or lower), the added information such as "like" and "comment" is not used.

The use of the importance level of the added information such as "like" and "comment" is not limited to when a group or an image is to be selected. In addition, without being limited to the added information such as "like" and "comment", it may be determined whether or not operation information should be used, depending on the importance level of the operation information.

Finally, details of the image analyzing unit 54 will be described below.

As shown in FIG. 12, the image analyzing unit 54 performs plural image analysis processings including, for example, a face detection processing, a brightness determination processing, a color evaluation processing, a blurring evaluation processing, an event classification processing, and a similar image determination processing.

The face detection processing is a processing of detecting the number of faces (face areas), the face size, the face orientation, the face position, and the like of persons included in an image.

For example, as a result of the face detection processing, the image analyzing unit 54 determines an image having a large number of faces therein, an image having a large face size, an image having a face directed to the front, an image in which a face is located at the center thereof, and the like to have a high importance level, and sets the face score as the evaluation value of the result of the face detection processing to be high.

The brightness determination processing is a processing of evaluating image brightness of, for example, an entire image or a predetermined area such as a face area detected in the face detection processing.

The image analyzing unit 54 determines the brightness of, for example, the face area detected in the face detection processing as the brightness determination processing, sets the brightness score as the evaluation value of the result of the brightness determination processing to 1.0 when the brightness of the face area is suitable, and sets the brightness score to be lower when the area is excessively bright or excessively dark.

Since, in the above-described method, only the brightness score of an image including a face can be determined, for example, the brightness score of an image including a face may be determined as described above and the brightness score of an image not including a face may be determined on the basis of the brightness determination result of the entire image.

The color evaluation processing is a processing of evaluating the color tone of, for example, the entire image or a predetermined area such as a face area.

The image analyzing unit 54 sets the color score as the evaluation value of the result of the color evaluation processing to be relatively high, for example, when the color of the image is vivid, and sets the color score to be relatively low when the image is in a dull color or is colorless. The color score is set to be relatively high with respect to the image of appropriate exposure, and set to be relatively low with respect to the image of under-exposure or over-exposure.

The blurring evaluation processing is a processing of evaluating a degree of blurring of an image.

As a result of the blurring evaluation processing, the image analyzing unit 54 sets the blurring score as the evaluation value of the result of the blurring evaluation processing to 1.0, for example, when there is no blurring, and sets the score to be lower depending on the degree of blurring.

The event classification processing is a processing of classifying (grouping) images on the basis of shooting date and time of the images for each event such as birthday party or sports day. The similar image determination processing is a processing of determining similar images out of plural images for each event or the like.

The image analyzing unit 54 determines an event with a large number of images, an event with a large number of detected faces, an event with a large number of similar images, and the like to be important events as a result of the event classification processing and the similar image determination processing, and sets the event score as the evaluation value of the result of the event classification processing and the similar image determination processing to be high.

The similar image determination processing is not limited to determination of similar images for each event, but may include determining similar images out of images included in an arbitrary group, such as images uploaded by one and the same user, and images simultaneously uploaded.

Since the above-mentioned image analysis processings are conventional and various known image analyzing methods can be used in the present invention, the detailed methods thereof will not be described herein. The image analyzing unit 54 may perform image analysis processing other than described above.

In the image analyzing section 54, the face score, the brightness score, the color score, the blurring score, and the event score are determined in a range of 0.0 to 1.0 on the basis of the results of the image analysis processings such as the face detection processing, the brightness determination processing, the color evaluation processing, the blurring evaluation processing, the event classification processing, and the similar image determination processing, and the overall score of the scores as a result of the image analysis processings is calculated.

The results obtained by multiplying the resultant scores of the image analysis processings by predetermined weights may be added to calculate the overall score. In this embodiment, the weight of the score as a result of the face detection processing is set to be the largest. That is, the face weighting coefficient is set to 1.00, the brightness weighting coefficient is set to 0.05, the color weighting coefficient is set to 0.10, the blurring weighting coefficient is set to 0.05, and the event weighting coefficient is set to 0.20. The overall score is calculated using Equation (1).

$$\begin{aligned}\text{Overall score} = &\text{face score}*\text{face weighting coefficient}+ \\ &\text{brightness score}*\text{brightness weighting coefficient}+ \\ &\text{color score}*\text{color weighting coefficient}+ \\ &\text{blurring score}*\text{blurring weighting coefficient}+ \\ &\text{event score}*\text{event weighting coefficient}\end{aligned} \quad (1)$$

The basic description of the present invention has been made above.

While the present invention has been described in detail, the present invention is not limited to the above-mentioned embodiments, but may be improved or modified in various forms without departing from the gist of the present invention.

What is claimed is:

1. An image processing apparatus that creates a synthetic image using a plurality of images stored in an image managing server, comprising:
   an image acquiring unit that acquires a plurality of images from the image managing server;
   an image analyzing unit that analyzes each of the acquired images to determine evaluation values thereof;
   a grouping unit that groups the acquired images into a plurality of groups based on collateral information of each of the acquired images;
   a group selecting unit that selects a predetermined number of groups including images having operation information as the collateral information, which is information on an operation performed on each of the acquired images by a user and is added to each of the images, out of the plurality of groups;
   an image selecting unit that selects a predetermined number of images out of the images included in the selected groups, based on at least one of the evaluation values and the operation information; and
   an image arranging unit that arranges the predetermined number of selected images in a predetermined layout to create the synthetic image.

2. The image processing apparatus according to claim 1, wherein when a number of images included in all the selected groups is less than a recommended number of images, the group selecting unit is adapted to select a predetermined number of first additional groups out of groups identical in date to each of the selected groups.

3. The image processing apparatus according to claim 2, wherein when the number of images included in all the selected groups including the first additional groups is less than the recommended number of images, the group selecting unit is adapted to select a predetermined number of second additional groups out of groups closest in date to each of the selected groups.

4. The image processing apparatus according to claim 3, wherein when the number of images included in all the selected groups including the first and second additional groups is less than the recommended number of images, the group selecting unit is adapted to select a predetermined number of third additional groups out of groups second closest in date to each of the selected groups, and then repeatedly to select an additional group until the number of images included in all the selected groups including the first, second, and third additional groups is equal to or more than the recommended number of images.

5. The image processing apparatus according to claim 2, wherein the synthetic image is a photo book, and the recommended number of images is a fixed value determined in advance depending on a number of pages of the photo book.

6. The image processing apparatus according to claim 2, wherein the synthetic image is a photo book, and the recommended number of images is a value dynamically determined in a predetermined range of the recommended number of images depending on a number of pages of the photo book and a number of images suitable for the photo book that are extracted from the predetermined number of selected images.

7. The image processing apparatus according to claim 6, wherein the recommended number of images is determined to be an upper limit of the range of the recommended number of images when the number of images suitable for the photo book is equal to or more than the upper limit of the range of the recommended number of images,
   the recommended number of images is determined to be the number of images suitable for the photo book when the number of images suitable for the photo book is in the range of the recommended number of images, and
   the recommended number of images is determined to be a lower limit of the range of the recommended number of images when the number of images suitable for the photo book is equal to or less than the lower limit of the range of the recommended number of images.

8. The image processing apparatus according to claim 1, wherein the synthetic image is a photo book, and
   the image processing apparatus further comprises a re-grouping unit that re-groups the predetermined number of selected groups depending on a number of pages of the photo book.

9. The image processing apparatus according to claim 8, wherein when the number of pages of the photo book is larger than the number of selected groups, the re-grouping unit is adapted to perform a re-dividing processing to divide images of a group in which a number of images having the operation information added thereto is larger than a maximum number of images to be arranged in one page of the photo book into two groups between images having a longest shooting time interval between them.

10. The image processing apparatus according to claim 9, wherein the re-grouping unit is adapted to repeatedly perform the re-dividing processing until the number of images having the operation information added thereto in the group subjected to the re-dividing processing is equal to or less than the maximum number of images to be arranged in one page of the photo book.

11. The image processing apparatus according to claim 8, wherein when there is no group in which a number of images having the operation information added thereto is larger than a maximum number of images to be arranged in one page of the photo book, the re-grouping unit is adapted to divide images of a group having a largest number of images into two groups between images having a longest shooting time interval between them.

12. The image processing apparatus according to claim 8, wherein when the number of pages of the photo book is less than the number of selected groups, the re-grouping unit is adapted to perform a re-coupling processing to couple two groups having a shortest shooting time interval between them into one group.

13. The image processing apparatus according to claim 12, wherein when a number of images having the operation information added thereto in a group becomes larger than a maximum number of images to be arranged in one page of the photo book through the re-coupling processing, the re-grouping unit is adapted not to perform the re-coupling processing but to couple two groups having a second shortest shooting time interval between them into one group.

14. The image processing apparatus according to claim 8, wherein the image selecting unit is adapted to select all images having the operation information added thereto out of images included in the selected groups and to select other images out of images, which do not have the operation information added thereto and are included in the selected groups, based on the evaluation values, until a total number of images reaches a maximum number of images to be arranged in one page of the photo book.

15. The image processing apparatus according to claim 14, wherein when the selected groups do not include images having the operation information added thereto, the image selecting unit is adapted to select images out of the images, which do not have the operation information added thereto and are included in the selected groups, based on the evaluation values.

16. The image processing apparatus according to claim 1, wherein the image arranging unit is adapted to arrange an image selected out of images having the operation information added thereto among the predetermined number of selected images in a large area.

17. The image processing apparatus according to claim 1, wherein the group selecting unit and the image selecting unit are adapted to determine whether or not to use the operation information depending on an importance level of the operation information.

18. The image processing apparatus according to claim 17, wherein the importance level is set in two or more steps.

19. An image synthesizing system comprising:
an image managing server; and
the image processing apparatus according to claim 1 that creates a synthetic image using a plurality of images stored in the image managing server.

20. An image processing method of creating a synthetic image using a plurality of images stored in an image managing server, comprising the steps of:
acquiring a plurality of images from the image managing server;
analyzing each of the acquired images to determine evaluation values thereof;
grouping the acquired images into a plurality of groups based on collateral information of each of the acquired images;
selecting a predetermined number of groups including images having operation information as the collateral information, which is information on an operation performed on each of the acquired images by a user and is added to each of the images, out of the plurality of groups;
selecting a predetermined number of images out of the images included in the selected groups, based on at least one of the evaluation values and the operation information; and
arranging the predetermined number of selected images in a predetermined layout to create the synthetic image.

* * * * *